United States Patent [19]

Perrier et al.

[11] 4,032,293

[45] June 28, 1977

[54] PREPARATION OF STABLE STRONG BASE CELLULOSIC ANION EXCHANGERS WITH RED-OX POTENTIALS

[75] Inventors: Dorothy M. Perrier; Ruth R. Benerito, both of New Orleans; Richard H. Steele, Metairie, all of La.

[73] Assignee: The United States of America as represented by the Secretary of Agriculture, Washington, D.C.

[22] Filed: Sept. 9, 1974

[21] Appl. No.: 504,646

[52] U.S. Cl. .................................. 8/129; 8/120; 8/196; 210/50; 252/186; 252/188; 252/408 R; 260/2.1 R; 536/43
[51] Int. Cl.² ............... D06M 13/10; D06M 13/46; G01N 31/04
[58] Field of Search ............... 8/188, 196, 129; 260/231 A, 2.1 R

[56] References Cited

UNITED STATES PATENTS

| | | | |
|---|---|---|---|
| 2,261,294 | 11/1941 | Schlack | 8/188 |
| 2,459,222 | 1/1949 | Guthrie | 8/196 |
| 2,623,042 | 12/1952 | Vaughan | 8/196 |
| 2,768,162 | 10/1956 | Evans | 260/231 A |
| 3,379,719 | 4/1968 | Rulison | 8/196 |
| 3,464,781 | 9/1969 | Berni et al. | 8/196 |
| 3,494,719 | 2/1970 | Soignet et al. | 260/231 A |
| 3,510,248 | 5/1970 | Thielen et al. | 8/196 |
| 3,644,082 | 2/1972 | Berni et al. | 8/188 |
| 3,652,540 | 3/1972 | Determann et al. | 260/231 A |
| 3,751,376 | 8/1973 | Quentin | 260/2.1 R |
| 3,754,055 | 8/1973 | Rembaum | 260/2.1 R |

OTHER PUBLICATIONS

Smith, "Chemistry of Open Chain Nitrogen Compds.", vol. I, 1965, W. A. Benjamin, Inc., pp. 23, 24 & 25.
Benerito et al., Analytical Chemistry, vol. 37, 1965, pp. 1693–1699.
Samuelson, "Ion Exchange—", 1963, pp. 53, 70, 71, 72, 73, 414, 415.
Calmon et al., "Ion Exchangers—", 1957, pp. 30, 31, 57, 642.

*Primary Examiner*—Murray Tillman
*Assistant Examiner*—Arthur H. Koeckert
*Attorney, Agent, or Firm*—M. Howard Silverstein; David G. McConnell; Salvador J. Cangemi

[57] ABSTRACT

Strong base quaternary ammonium cellulose derivatives prepared under anhydrous conditions are further chemically modified in selected organic solvents by a sequential process that produces a partial cellulose ether in fibrous form that can be used in electro-chemical reactions covering a range of oxidation-reduction potentials. These new derivatives can be prepared such that they stabilize a given anion in the cellulose matrix until such time as its oxidation or reduction power is needed in desired chemical reactions. Although prepared in nonaqueous media, these red-ox cellulosic anion exchangers can be used to regulate oxidation-reduction reactions in aqueous media. Some of these new red-ox anion exchangers are dispersible in water and can be reprecipitated by organic solvents without losing their red-ox abilities during the process. Others are water insoluble. Thus these red-ox cellulosic exchangers can be tailor made to specific end uses such as for applications in separation of biochemical or organic mixtures, the identification of reducible or oxidizable chemicals, purification of polluted liquids by oxidation or reduction of contaminants.

16 Claims, No Drawings

PREPARATION OF STABLE STRONG BASE CELLULOSIC ANION EXCHANGERS WITH RED-OX POTENTIALS

RELATED COPENDING APPLICATIONS

U.S. patent application Ser. No. 446,439, filed Feb. 27, 1974, discloses synthesis of diquaternary-cross-linked cellulosic ethers as the bromide, iodide and chloride salts thereof.

U.S. patent application Ser. No. 446,440, also filed Feb. 27, 1974, discloses a process for producing quaternary nitrogen cellulosic ethers as the bromide, iodide and chloride salts thereof, whereby long chain alkyl groups are introduced into tertiary amino cellulosic ethers.

PRIOR ART AND BACKGROUND

The prior art teaches the preparation of quaternary ammonium cellulose anion exchangers (see Benerito, Woodward and Guthrie, Analytical Chemistry 37, page 1693 [1965] and U.S. Pat. No. 3,644,082) by the lower alkyl halide alkylation of diethylaminoethyl (DEAE) celluloses under anhydrous conditions.

In contrast to the prior art, the present invention relates to the unique properties of quaternary ammonium groups as occur in the cellulose matrix of those products described in the prior art as well as those disclosed in the foregoing related copending applications, wherein according to this invention these products act as stabilizers for a variety of anions that can be used as oxidizing or reducing reagents in a variety of applications. Because of the large size of the quaternary ammonium groups ($N^+R_4$) and its polarizability, it can be considered as a "soft" group rather than a "hard" group as defined by the Hard-Soft acid base theory of chemical reactions as proposed by Pearson in the J. of Chemical Education, Vol. 45, No. 9, pp. 581–587, No. 10, pp. 643–648, 1968. Also, because of the effect of such large NRhd $4^+$ charged groups on the structure of water, the tendency of $NR_4^+$ groups and other "soft" anions, such as $O_2^-$ and $SC^-N$, would be to associate in the presence of water to lessen the changes in entropy and energy occurring when water is added to a substance having both a soft $NR_4^+$ group and a soft anionic group. Therefore, this instant invention is a process whereby $NR_4^+$ groups in a cellulose matrix can be used to advantage to protect or stabilize selected anions that might be too reactive in aqueous media when in the presence of common alkali metal cations like $Na^+$ or $K^+$. This invention relates to a process comprising a sequence of steps carried out under anhydrous conditions to yield a product that contains mono-quaternary ammonium cations or diquaternary ammonium cations associated with anions many of which could not be introduced into the matrix in the presence of water, but once introduced in non-aqueous conditions can then be used over a period of time in aqueous media because of the stabilizing or protective properties of the quaternary groups with which the anions are associated in the polymeric cellulosic matrices.

EQUATIONS PERTINENT TO THIS INVENTION

In the following equations given to represent the instant invention, Cell-$OC_2H_4$ $N^+(C_2H_5)_2R$ $X^-$ and

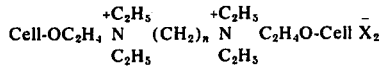

respectively the mono quaternary ammonium cellulose halide where R can range from $CH_3$ to $C_{18}H_{35}$ and the diquaternary ammonium cellulose dihalide where n, the number of methylene groups in the crosslink, can vary from 2 to 10. These quaternary halides or dihalides must be prepared in completely nonaqueous media as described in the prior art. The reactions illustrated must be performed in the absence of moisture in order to yield the final products.

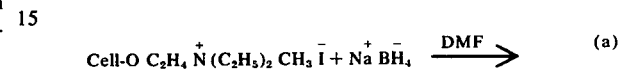

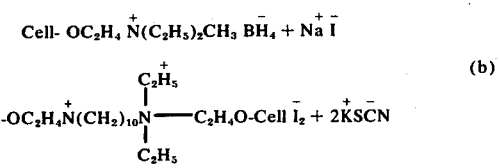

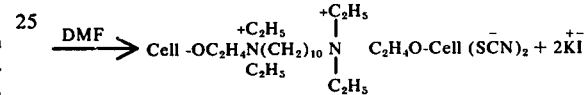

The above are simply illustrative of the types of reactions required. Selection of nonaqueous solvent is based on the solubilities of product other than the quaternary cellulose anion exchanger that must be removed for reaction to proceed towards completion.

In the preparation of quaternary ammonium compounds, those versed in the art know that the greatest degree of conversion is obtained when quaternization of a tertiary amine group is brought about with an alkyl iodide rather than another halide. In the present invention consideration must be given to the reducing powers of the iodide ion when the desired product is a quaternary ammonium compound of an anion capable of oxidizing the iodide. The following sequence of steps are illustrative of what is required for the conversion to the superoxide of a quaternary. The process cannot be initiated with a quaternary chloride as the degree of conversion to a quaternary by use of an alkyl chloride is too small.

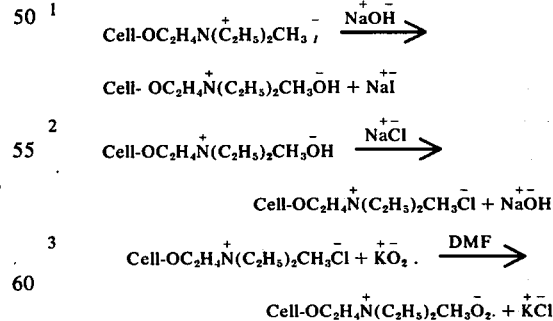

Although the exchange of iodide for hydroxide and of hydroxide for chloride (steps 1 and 2 of C above) can be performed in either aqueous or nonaqueous media, the thrid step (3 of c above) must be performed under completely anhydrous conditions. Therefore, if steps (1 ) and (2) above are exchanges in water, the product must be solvent exchanged to remove all water before the chloride is exchanged for superoxide anions. Superoxide anions are too reactive to exist in water or in the presence of proton donors and must therefore be introduced in the absence of water or of protic solvents and can be exchanged only for anions not capable of undergoing oxidation-reduction reactions with the superoxide anion.

OBJECTIVES OF THE PRESENT INVENTION

The main objective of the present invention is to provide a process for tailoring fibrous cellulose ethers that contain stable quaternary of diquaternary ammonium base groups associated via electrostatic bonds with selected anions that are used as oxidizing or reducing reagents such that the resultant products can be handled as fibrous cellulosic products, will have stable shelf lives and can be subsequently easily used in either aqueous or nonaqueous media for subsequent chemical reactions that require an oxidizing or reducing reagent of a given electrode potential and yet one that can be easily handled for use and for removal from a liquid phase that required a red-ox reagent.

Another objective of the present invention is to provide a new compound of the superoxide anion ($O_2^-$.) that will be stable enough to be handled and one in which the superoxide anion, a powerful oxidizing reagent, will be protected via the hydrophobic properties of the associated quaternary ammonium cation from the adverse effects of water or protic solvents such as alcohols.

A third objective of the present invention is to provide a fibrous cellulosic derivative containing a strong reducing reagent such as the borohydride anion that can be easily handled and used as such in nonaqueous media or in aqueous media to promote the reduction of selected organic or inorganic compounds at controlled rates by a 2 phase process.

A fourth objective of the present invention is to provide fibrous cellulosic derivatives that are not only ion exchangers but are also red-ox reagents and that can be prepared for use with a given anion such that the fibrous product will be either insoluble in water or dispersible in water to satisfy selected end-uses of the red-ox cellulosic product. These that are dispersible in a water phase can subsequently be reprecipitated by addition of an organic phase for easy removal.

GENERAL ASPECTS OF THE PRESENT INVENTION

The present invention can best be described as both a plurality of fibrous cellulosic derivatives and the processes required to produce these unique red-ox cellulosic reagents. These cellulosic derivatives containing both strong base quaternary ammonium sites associated with an oxidizing or reducing anion are easily prepared in the absence of water but once prepared in nonaqueous media can be used subsequently in water as well as in organic solvents to bring about a variety of oxidation or reduction changes. If a water insoluble red-ox exchanger is desired, it is important that the cellulosic substrate be crosslinked via diquaternary ammonium groups in those instances where the monoquaternary ammonium salt is water soluble as in the instances of salts of anions such as the superoxide, borohydride, or thiocyanate. Cross-linking of cellulosic chains formed by use of an alkyl dihalide that reacts with tertiary amine groups to produce diquaternary ammonium groups forms intermolecular bonds between cellulosic chains and prevents the solubility of the final red-ox cellulosic product in water. On the other hand, if a water dispersible red-ox cellulosic product is needed for a specific end use, the instant process makes use of a mono-quaternary ammonium anion exchanger as the original substrate.

The fibrous substrates to which this invention can be applied include cotton, ramie, jute, flax, and the like fibrous cellulosic materials. In the process of this investigation, the bulk of the work was done employing cotton, mainly in the form of woven fabrics. Those skilled in the art should readily visualize extensions of the products and processes of this invention to other forms of cellulosic materials.

It should be noted that any mono- or di-quaternary ammonium cellulosic material in the anhydrous state that contains as little as 0.5% nitrogen or as much as 4.0% nitrogen in the quaternary oxidation state can be used in the process. Introduction of the red-ox anions that are to be stabilized by the mono-quaternary or di-quaternary groups must be brought about under anhydrous conditions in such aprotic solvents as dimethylformamide. All nonaqueously prepared red-ox exchangers are washed free of reagents in nonaqueous media and those dispersible or soluble in water must be stored in aprotic organic solvents before use or in moisture-free containers to prevent loss of red-ox powers.

EVALUATION OF CELLULOSIC DERIVATIVES OF THE INVENTION

Degree of conversion of the quaternary ammonium cellulosic materials to the red-ox exchanger form was determined by wet chemical analyses in which the meqs. of nitrogen and meqs. of red-ox anion were determined. Potentiometric titration curves were also used to determine degree of conversion. Electron emission spectroscopy of final products also yielded relative amounts of elements and thus amount of product yield. In those instances of free radicals as in the superoxide anion form, the electron paramagnetic resonance spectra were used to follow shelf life of the $O_2^-$. stabilized in the cellulosic matrix. In those instances where the anion was divalent, some evidence of crosslinking between $N^+R_4$ groups on different cellulosic chains was estimated by increases in dry and wet wrinkle recoveries (ASTM D1295-67) as in the case of the cellulosic derivatives containing dichromate ($Cr_2O_7^{--}$) anions.

The following examples are provided to illustrate certain embodiments of the invention and should not be construed as limiting the invention in any manner.

EXAMPLE 1

Samples of desized, scoured and bleached cotton fabrics (80 × 80 thread count) were converted in nonaqueous media to sodium cellulosates and then to diethylaminoethyl (DEAE) cottons that contained free amino groups as described in the prior art. (See "Preparation of DEAE-Cotton Fabrics" by D. M. Soignet and R. R. Benerito, pp. 1001–03, Textile Research Journal, Vol. 37, 1967) These DEAE-cottons so prepared had a range of nitrogen contents varying from 0.5% to 4.0% as determined by experimental conditions described in the prior art. The DEAE-cotton was quaternized with a 20% by weight solution of methyl iodide in anhydrous methanol at reflux temperature for approximately 5 hours that allowed for nearly complete conversion of even the high nitrogen content DEAE-cotton to the quaternary ammonium iodide. After rinsing the quaternary ammonium cellulosic iodide in absolute methanol the quaternary iodide was treated with a 4% by weight solution of potassium thiocyanate (KSCN) in anhydrous dimethylformamide (DMF) for seven hours at room temperature. Fabrics were treated with enough solution of the thiocyanate to assure at least a 3/1 excess as based on amount of iodide in the original quaternary halide. Excess KSCN was removed by rinsing in excess DMF to yield a fabric containing 5.7% sulfur and still in fabric form. The fabric could be used in fabric form to cause a variety of reactions characteristic of the $SC^-N$ ion or of its reducing powers. When the fabric was placed in an aqueous solution, it was completely dispersed and formed long single fibers that still gave chemical reaction characteristic of the $SC^-N$ ions.

EXAMPLE 2

A sample of cotton was treated as described in Example 1 to convert it under anhydrous conditions to the quaternary ammonium cellulose iodide with methyl iodide. Then instead of converting the iodide directly to the quaternary ammonium thiocyanate as described in Example 1, the iodide was exchanged in a water solution of .1M NaOH to convert the exchanger to the quaternary ammonium strong base after which the hydroxide form was converted to the chloride form by treatment with 0.1MHCl in water. Neither the hydroxide form nor the chloride form of this quaternary ammonium cellulose ether dissolved in water and fabric properties were maintained. The chloride form was then solvent exchanged first with absolute methanol and then with anhydrous DMF to remove all water before the chloride was exchanged with a 4% KSCN solution in DMF for 7 hours at room temperature. The product possessed both strong base quaternary ammonium groups and the reducing groups, $SC^-N$. The final product partially dissolved and was dispersible in water. It gave all reactions characteristic of the thiocyanate ion.

EXAMPLE 3

A 10 gram sample of cotton was treated as in Example 1 except that quaternization of the DEAE-cotton was effected with an anhydrous alcoholic solution of 1,5-diiodopentane ($1(CH_2)_5 1$) instead of methyl iodide. The resultant diquaternary ammonium diiodide cellulose derivative was washed in alcohol and then anhydrous DMF before being treated with 600 ml of DMF containing 26 g of KSCN for 7 hours at room temperature. The fabric after being washed in DMF was found to contain 4.6% nitrogen and 4.6% sulfur. The product was insoluble not only in organic solvents but also in water. The diborohydride form of the diquaternary ammonium cellulose exchanger reduced iodine to iodide in aqueous and nonaqueous media.

EXAMPLE 4

Samples of fabric were treated as described in Example 1 except that a solution of 20% of sodium borohydride ($NaBH_4$) in DMF was substituted for the thiocyanate solution. This fabric containing 2.6% nitrogen and 1.17% boron, was insoluble in DMF in which media it reduced iodine to colorless iodide ions and reduced the blue oxidized form of methylene blue to the colorless reduced form in DMF. When water was added, the borohydride form of the quaternary ammonium cellulose exchangers dispersed immediately to form single short fibers.

EXAMPLE 5

A 10 g sample of DEAE cotton was quaternized with $CH_3I$ nonaqueously and then exchanged in aqueous media to the hydroxide and to the chloride form of the quaternary ammonium cellulose derivative as described in Example 2. The chloride form was solvent exchanged to remove all water before it was treated with a 0.25% potassium superoxide ($KO_2$.) in anhydrous DMF for 7 hours at room temperature. Then the final superoxide anion form of the quaternary cellulose derivative was washed and stored in anhydrous DMF. Electron paramagnetic resonance analyses of the product gave a signal showing presence of the free radical anion, $O_2^-$., and electron emission spectroscopy showed that the nitrogen had a higher bonding energy in the superoxide anion form than in the other anionic forms. Changes in these spectra with time showed the superoxide anion was stabilized by the quaternary group and appeared after long intervals provided water was not present. When immersed in water, the superoxide anion form was dispersible.

EXAMPLE 6

A 10 gram sample of DEAE cotton was quaternized under anhydrous conditions with methyl iodide as described in Example 1. The iodide form was then exchanged for chloride ions by treatment with a DMF solution of a chloride at room temperature. After removal of all iodide ions, which would reduce chromate ions, the chloride form of the quaternary ammonium cellulose derivative was treated with 600 ml of DMF that contained 94 g of sodium dichromate ($Na_2Cr_2O_7$) for 7 hours at room temperature. After being washed in excess DMF, the product by analyses contained 2.9% nitrogen and 8.48% chromium. Its oxidizing powers were demonstrated by the formation of a brown color of iodine when the fabric was contacted with an acidic solution of colorless Kl in DMF. The fabric was also capable of causing a colorless solution of the dye methylene blue in DMF to turn to the blue oxidized form. The dichromate form of fabric exhibited oxidizing powers not only in organic media such as DMF but also in water. The dichromate forms of fabric were also insoluble in water solutions. These quaternary ammonium base cellulose derivatives in the dichromate form displayed higher wrinkle recovery angles in both wet and conditioned states than did the salt forms of monovalent anions. Formation of such crosslinks between $N^+R_4$ sites probably accounts for insolubility of these cellulosic oxidizing reagents.

We claim:
1. A process for preparing a textile with strong base quaternary ammonium cellulose groups associated with reducing anions, the process comprising:
   a. immersing a diethylaminoethyl fibrous cellulose of about 2.6% nitrogen content in a 20% methanolic solution of methyl iodide,
   b. refluxing the immersed fibrous material for about 5 hours to obtain a fibrous monoquaternary cellulosic derivative, the methyl iodide adduct of DEAE-cellulose,
   c. rinsing the adduct in absolute methanol to remove all unreacted reagent, and
   d. treating the product of (c) with a 20% dimethyl formamide solution of sodium borohydride for about 7 hours at room temperature to yield a textile containing about 2.6% nitrogen and 1.17% boron, which product being insoluble in dimethylformamide but dispersible in water.

2. A process for preparing a textile with strong base quaternary ammonium cellulose groups associated with anions of strong oxidizing powers, the process comprising:
 a. immersing a diethylaminoethyl fibrous cellulose of about from 0.5% to 4.0% nitrogen content in a 20% methanolic solution of methyl iodide,
 b. refluxing the immersed fibrous material for about 5 hours to obtain a fibrous quaternary cellulosic derivative, the methyl iodide adduct of DEAE-cellulose,
 c. converting the iodide to the hydroxide by washing the iodide in an aqueous .1 Molar sodium hydroxide,
 d. forming the chloride by treating the fibrous cellulosic product of (c) with an aqueous 0.1 Molar hydrochloric acid, and
 e. solvent exchanging the product of (d) to remove all water present with anhydrous dimethylformamide and treating with an anhydrous 0.25% dimethylformamide potassium superoxide solution to produce a textile with superoxide anions stabilized by quaternary ammonium groups, which product being water dispersible but having powerful oxidizing powers and other properties characteristic of the free radical ions.

3. A process for preparing a textile with strong base diquaternary ammonium cellulose groups associated with reducing anions, the process comprising:
 a. immersing a diethylaminoethyl fibrous cellulose of about from 0.5% to 4.0% nitrogen content in an anhydrous methanolic solution of about 10% 1,5-diiodopentane,
 b. refluxing the immersed fibrous cellulose derivative for a period of about 5 hours to obtain a fibrous diquaternary cellulosic derivative associated with iodide anions,
 c. washing the product of (b) in absolute methanol to remove unreacted reagent, and
 d. treating the product of (c) with a 4% dimethylformamide solution of sodium borohydride for a period of about 7 hours at room temperature to produce a textile with a diquaternary ammonium cellulose groups associated with reducing anions and containing from 0.5 to 4.0% nitrogen and from 0.4 to 3.2% boron, which product being insoluble in water and organic solvents but having all reducing characteristics of the borohydride anion.

4. A process for preparing a textile with strong base diquaternary ammonium cellulose groups associated with oxidizing or reducing anions, the process comprising:
 a. immersing a diethylaminoethyl fibrous cellulose with about from 0.5% to 4.0% nitrogen content in an anhydrous methanolic solution of about 15% 1,10-dibromodecane,
 b. refluxing the immersed fibrous cellulose derivative for a period of about 7 hours to obtain a fibrous diquaternary cellulose derivative associated with bromide anions,
 c. washing the product of (b) in absolute methanol to remove unreacted reagent, and
 d. treating the product of (c) with a 0.5% solution of potassium superoxide (KO$_2$.) in anhydrous dimethylformamide for about 7 hours at room temperature to produce a textile with diquaternary ammonium cellulose groups associated with free radical anions that can be used in aqueous or nonaqueous media to promote oxidation-reduction reactions or free radical reactions in a 2-phase system.

5. A process for insolubilizing and stabilizing anions which are reactive in aqueous media, said process comprising:
 a. providing a quaternary ammonium cellulose halide of the formula

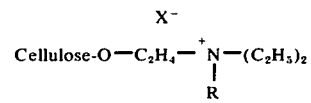

wherein X$^-$ is halide and R is alkyl of from —CH$_3$ to —C$_{18}$H$_{35}$;
 b. admixing an anhydrous solution of said anion where said anion is selected from BH$_4^-$ and O$_2^-$ with said halide, whereby a quaternary ammonium cellulose-stabilized and -insolubilized anion is obtained; and
 c. contacting said quaternary ammonium cellulose-stabilized and -insolubilized anion with water.

6. A process for insolubilizing and stabilizing anions which are reactive in aqueous media, said process comprising:
 a. providing a quaternary ammonium cellulose halide of the formula

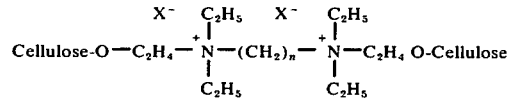

wherein X$^-$ is halide and $n$ is an integer of from 2 to 10;
 b. admixing an anhydrous solution of said anion where said anion is selected from BH$_4^-$ and O$_2^-$ with said halide, whereby a quaternary ammonium cellulose-stabilized and -insolubilized anion is obtained; and
 c. contacting said quaternary ammonium-stabilized and -insolubilized anion with water.

7. The process of claim 5 wherein the anion is selected from the group consisting of BH$_4^-$.

8. The process of claim 5 wherein the anion is O$_2^-$.

9. The process of claim 6 wherein the anion is selected from the group consisting of BH$_4^-$.

10. The process of claim 6 wherein the anion is O$_2^-$.

11. A strong base cellulosic anion exchange textile of the general formula

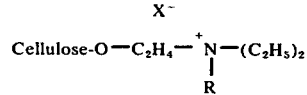

wherein X$^-$ is an anion selected from the group consisting of BH$_4^-$, O$_2^-$ and R is alkyl of from -CH$_3$ to -C$_{18}$H$_{35}$, said textile having a nitrogen content of about 0.5% to 4.0%.

12. The textile of claim 11 wherein the anion is O$_2^-$.

13. The textile of claim 11 wherein the anion is BH$_4^-$.

14. A strong base cellulosic anion exchange textile of the general formula

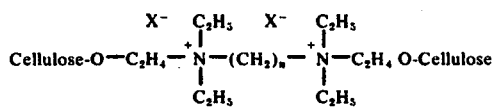
wherein X⁻ is an anion selected from the group consisting of $BH_4^-$, and $O_2^-$ and $n$ is an integer of from 2 to 10, said textile having a nitrogen content of about from 0.5% to 4.0%.
15. The textile of claim 14 wherein the anion is $O_2^-$.
16. The textile of claim 14 wherein the anion is $BH_4^-$.